Nov. 15, 1927.

E. W. DAVIS 1,649,155

LUBRICATING MEANS

Filed Oct. 25, 1923

Inventor
Ernest W. Davis

Patented Nov. 15, 1927.

1,649,155

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING MEANS.

Application filed October 25, 1923. Serial No. 670,738.

My invention relates to improvements in lubricating means, and is particularly concerned with the provision of a novel lubricant compressor forming a part of a lubricating system comprising a plurality of fittings attached to the various bearings to be lubricated and a compressor for successively making sealed connection with the fittings so as to permit lubricant under high pressure to be forced into the fittings and the bearings connected therewith.

One of the objects of the present invention is to provide a compressor adapted to form a part of such lubricating system and particularly adapted for the use of supplying oil to the bearings to be lubricated.

Another object of my present invention is to provide a lubricant compressor such as described comprising means whereby sealed connections with the various fittings can be easily made and unmade.

Another object of my invention is to provide a construction by means of which comparatively high pressures can be exerted upon the lubricant by a simple thrust exerted in the direction of the fitting.

A still further object of my invention is to provide a construction of the character described comprising a barrel having a discharge conduit which performs the function of a high pressure cylinder and a piston operable therein and formed of a gasket which acts both as a piston and as a valve to permit the passage of lubricant from the barrel to the discharge end of the conduit or high pressure cylinder.

Another object of my invention is to provide a compressor such as described which is simple in construction, economical to manufacture and easy to operate.

Other objects of my invention will appear as this description progresses, reference being had to the accompanying drawings, in which—

Figure 1:
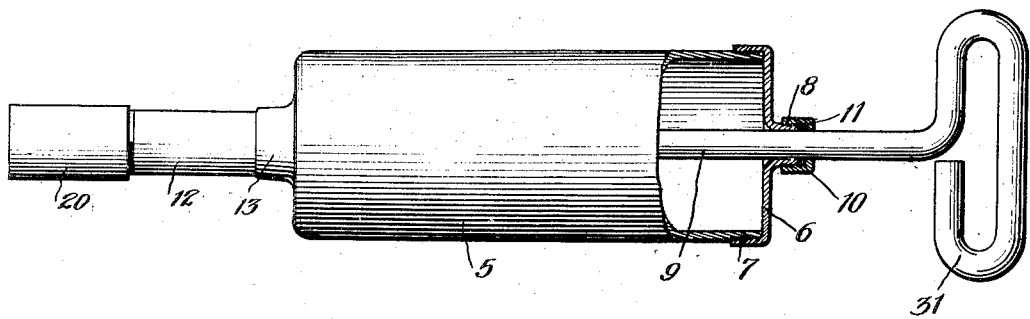
Figure 2:
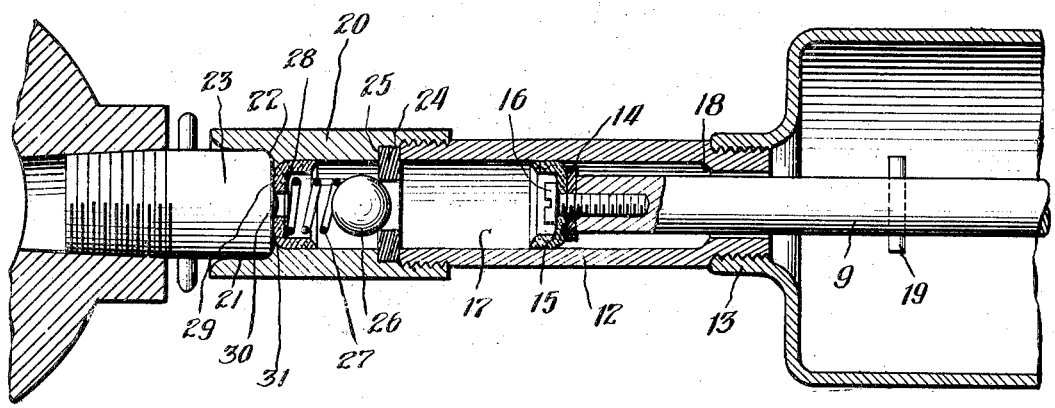

Figure 1 is a side elevation of my improved compressor partially in central longitudinal section; and Figure 2 is an enlarged longitudinal sectional detail.

Similar reference characters will be used in both figures for referring to similar parts.

Referring to the drawings, my improved compressor comprises a cylindrical barrel 5 which may be of conventional construction and which is provided with the removable cap 6 secured thereto by a screw-threaded connection 7. Preferably, this cap is provided with a central outwardly extending nipple 8 to act as a bearing for the smooth piston rod 9 which slides therein. If desired, a gasket 10 and a gland 11 may be used for insuring a tight connection between the nipple 8 and the piston rod 9.

A rigid discharge conduit 12 is threaded into the nipple 13 at the opposite end of the compressor barrel and forms a high pressure cylinder in which is slidably mounted a piston comprising the follower plate 14 and the cup leather 15, both of which are secured to the inner end of the piston rod 9 by means of a screw 16, or in any other suitable manner. I prefer to enlarge the bore 17 of the discharge conduit 12 to provide a shoulder 18 engageable by the follower 14 upon the return stroke of the piston rod to act as a stop to limit the return stroke. A pin 19, passing through the piston rod and adapted to engage with the inner end of the discharge conduit 12, may be used for limiting the discharge stroke of the piston.

Threaded to the outer end of the discharge conduit 12 is a sleeve 20, the outer end of which is counter bored, as shown at 21, to provide a shoulder 22 for engaging the end of the fitting 23. This fitting is of well-known construction and further description thereof is believed to be unnecessary.

An annular valve seat 24 is clamped between the shoulder 25 formed at the inner end of the sleeve 20 and the outer end of the discharge conduit 12. A ball closure 26 is yieldingly held upon the valve seat 24 by means of the compression spring 27. The other end of the compression spring 27 reacts against a washer 28 in the bottom of the cup leather 29, the outer face of which is adapted to contact with the end of the fitting 23. The cup leather is provided with a central aperture 30 registering with the opening in the washer 28 to permit the discharge of lubricant from the compressor.

The inner end of the bore of the sleeve 20 is slightly enlarged to provide a shoulder 31 for limiting the outward movement of the gasket 29.

In use the compressor is held with the discharge conduit below the level of the barrel and the piston rod is retracted. Inasmuch as the valve 26 is held upon its seat by the spring 27, a vacuum will be created between this valve and the piston 15. This will cause oil to be sucked down through the narrow portion of the discharge conduit 12 around the inner end of the piston rod and past the piston 15. The discharge conduit or high pressure cylinder having been filled in this manner, the operator places the outer end of the sleeve 20 over the fitting 23 and pushes inwardly upon the handle 31 carried by the outer end of the piston rod. The diameter of the piston 15 is larger than the area of the gasket 29, which is in contact with the fitting 23, so that when the piston rod 9 is forced inwardly a differential pressure is produced which firmly holds the sleeve 20 in contact with the fitting and the pressure of the lubricant exerted upon the rear of the gasket 29 holds the gasket in firm contact with the end of the nipple, so as effectively to prevent any leakage between the compressor and the fitting.

Upon releasing the pressure on the handle 31 the ball closure 26 will close upon its seat and thereby prevent lubricant from escaping from the high pressure cylinder. The opening 30 in the gasket can be made small enough so that capillary action will prevent the escape of lubricant from the space between the valve seat 24 and the gasket 29.

It will, of course, be understood that the seal between the nipple 8 and the piston rod 9 will not be made too tight to permit the entrance of air into the barrel to relieve the vacuum produced therein by the removal of lubricant therefrom.

From the above description it will be apparent that I have provided a compressor which is simple in construction, economical to manufacture and which comprises means whereby sealed connections with the various fittings can be successively made and unmade with the greatest facility.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a barrel having a rigid discharge conduit communicating therewith, a cap for said barrel having an opening registering with the bore of said discharge conduit, a piston rod slidable in said opening and projecting into said discharge conduit, said piston rod having a smaller diameter than said bore, so as to provide a clearance around said piston rod, a cup leather piston carried by the inner end of said piston rod and forming a valve permitting the passage of lubricant from said barrel to said discharge conduit, a sleeve secured to the outer end of said discharge conduit, a valve seat clamped between said sleeve and said discharge conduit, a cup leather gasket in the outer end of said sleeve, the exposed area of said gasket being smaller than the effective area of said cup leather piston, a check valve for co-acting with said valve seat and a common spring for yieldingly holding said valve in its closed position and said gasket in its outermost position.

2. A lubricant compressor comprising a barrel having a rigid discharge conduit communicating therewith, a piston rod mounted to reciprocate in said discharge conduit, said piston rod having a smaller diameter than the bore of said discharge conduit, so as to provide a clearance around said piston rod, a piston carried by the inner end of said piston rod and forming a valve permitting the passage of lubricant from said barrel to said discharge conduit, a sleeve secured to the outer end of said discharge conduit, a valve seat clamped between said sleeve and said discharge conduit, a gasket in the outer end of said sleeve, the exposed area of said gasket being smaller than the effective area of said piston, a check valve for co-acting with said valve seat and a common spring for yieldingly holding said valve in its closed position and said gasket in its outermost position.

3. A lubricant compressor comprising a barrel having a rigid discharge conduit communicating therewith, a piston rod mounted to reciprocate in said discharge conduit, said piston rod having a smaller diameter than the bore of said discharge conduit so as to provide a clearance around said piston rod, a piston carried by the inner end of said piston rod and forming a valve permitting the passage of lubricant from said barrel to said discharge conduit, a sleeve secured to the outer end of said discharge conduit, a valve seat between said sleeve and said discharge conduit, a gasket in the outer end of said sleeve, the exposed area of said gasket being smaller than the effective area of said piston, a check valve for co-acting with said valve seat and means for yieldingly holding said valve in its closed position and said gasket in its outermost position.

4. A lubricant compressor comprising a barrel having a rigid discharge conduit provided at its outer end with means for receiving a fitting, a piston slidably mounted in said discharge conduit and forming a valve permitting the passage of lubricant, past said piston, from said barrel to the outer end of said discharge conduit, an outwardly opening valve yieldably closing the outer end of said discharge conduit, and means actuated in part by the pressure of the lubricant for effecting a sealed connection between said conduit and a fitting.

5. A lubricant compressor comprising a barrel having a removable cap at one end and a discharge conduit at the other, a piston rod slidably mounted in said cap and projecting into said discharge conduit, said piston rod being smaller in diameter at its inner end than the bore of said discharge conduit, a cup leather secured to the inner end of said piston rod and forming both a piston for ejecting lubricant from said discharge conduit, and a valve for permitting the passage of lubricant from said barrel to the outer end of said discharge conduit, and means carried by the outer end of said discharge conduit for effecting a sealed connection with a fitting.

6. A lubricant compressor comprising a barrel having a discharge conduit forming a high pressure cylinder, a piston reciprocable in said discharge conduit, a valve closing the outer end of said discharge conduit, means for effecting a sealed connection with a fitting comprising a gasket, and common means for yieldingly holding said valve in its closed position and said gasket in its outermost position.

In witness whereof, I hereunto subscribe my name this 20 day of October, 1923.

ERNEST W. DAVIS.